US009352312B2

(12) United States Patent
Grover et al.

(10) Patent No.: US 9,352,312 B2
(45) Date of Patent: May 31, 2016

(54) SYSTEM AND APPARATUS FOR REACTIONS

(75) Inventors: Simon Roderick Grover, Cambridge (GB); Paul Graham Wilkins, Cambridge (GB); Nick David Rollings, St. Albans (GB); Peter Laurence Mayne, London (GB); Wai Ting Chan, Cambridge (GB); Natalie Frances Scott, Cambridge (GB); Olivier Fernand Flick, Cambridge (GB); Henry Charles Innes, Princeton, NJ (US); Martyn Gray Darnbrough Beedham, Cambridge (GB); Nicholas David Long, Harrold (GB); Richard John Hammond, Cambridge (GB)

(73) Assignee: Alere Switzerland GMBH, Zug (CH)

( * ) Notice: Subject to any disclaimer, the term of this patent is extended or adjusted under 35 U.S.C. 154(b) by 999 days.

(21) Appl. No.: 13/242,999

(22) Filed: Sep. 23, 2011

(65) Prior Publication Data

US 2013/0078736 A1 Mar. 28, 2013

(51) Int. Cl.
*G01N 1/28* (2006.01)
*B01L 3/02* (2006.01)
(Continued)

(52) U.S. Cl.
CPC ............... *B01L 3/502* (2013.01); *B01L 3/0217* (2013.01); *A61J 1/2096* (2013.01); *B01L 2200/025* (2013.01); *B01L 2200/026* (2013.01);
(Continued)

(58) Field of Classification Search
CPC ... B01L 3/0217; B01L 3/502; B01L 3/50825; B01L 3/565; B01L 2200/025; B01L 2200/026; B01L 2200/16; B01L 2300/025; B01L 2300/041; B01L 2300/046; B01L 2200/028; B01L 2200/04; B01L 2300/06; B01L 2300/0609; B01L 2300/08; B01L 2300/0848; A61J 1/2096; A61J 1/2089; Y10T 436/2575
See application file for complete search history.

(56) References Cited

U.S. PATENT DOCUMENTS

| | | | | | |
|---|---|---|---|---|---|
| 726,629 | A * | 4/1903 | Brown | .......................... | 215/364 |
| 3,653,839 | A * | 4/1972 | Luks et al. | .................... | 436/166 |

(Continued)

FOREIGN PATENT DOCUMENTS

| | | |
|---|---|---|
| EP | 2302029 | 3/2011 |
| WO | WO 98/39485 | 9/1998 |

(Continued)

OTHER PUBLICATIONS

Allshire, "RNAi and Heterochromatin—a Hushed-Up Affair," Science, 297:1818-1819, 2002.

(Continued)

*Primary Examiner* — Christopher A Hixson
(74) *Attorney, Agent, or Firm* — Fish & Richardson P.C.

(57) ABSTRACT

This disclosure provides systems, apparatuses, and methods for liquid transfer and performing reactions. In one aspect, a system includes a liquid transfer device having a housing having a pipette tip and a plunger assembly; and a reaction chamber, wherein the housing of the liquid transfer device is configured to sealably engage with the reaction chamber. In another aspect, a liquid transfer device including a housing having a pipette tip; and a plunger assembly disposed within the housing and the pipette tip, wherein a portion of the plunger assembly is configured to engage a fluid reservoir such that the plunger assembly remains stationary relative to the fluid reservoir and the housing moves relative to the plunger assembly.

21 Claims, 12 Drawing Sheets

(51) Int. Cl.
*B01L 3/00* (2006.01)
*A61J 1/20* (2006.01)

(52) U.S. Cl.
CPC ........ *B01L2200/16* (2013.01); *B01L 2300/025* (2013.01); *Y10T 436/2575* (2015.01)

(56) References Cited

U.S. PATENT DOCUMENTS

| | | | | | |
|---|---|---|---|---|---|
| 3,827,305 | A | * | 8/1974 | Gilson et al. | 73/864.18 |
| 4,153,057 | A | | 5/1979 | Kobel | |
| 5,027,855 | A | * | 7/1991 | Jaggi | 137/614.04 |
| 5,210,015 | A | | 5/1993 | Gelfand et al. | |
| 5,270,184 | A | | 12/1993 | Walker et al. | |
| 5,354,668 | A | | 10/1994 | Auerbach | |
| 5,397,698 | A | | 3/1995 | Goodman et al. | |
| 5,422,252 | A | | 6/1995 | Walker et al. | |
| 5,455,166 | A | | 10/1995 | Walker | |
| 5,470,723 | A | | 11/1995 | Walker et al. | |
| 5,487,972 | A | | 1/1996 | Gelfand et al. | |
| 5,556,751 | A | | 9/1996 | Stefano | |
| 5,591,609 | A | | 1/1997 | Auerbach | |
| 5,614,389 | A | | 3/1997 | Auerbach | |
| 5,681,705 | A | | 10/1997 | Schram et al. | |
| 5,712,124 | A | | 1/1998 | Walker | |
| 5,733,733 | A | | 3/1998 | Auerbach | |
| 5,744,311 | A | | 4/1998 | Fraiser et al. | |
| 5,747,246 | A | | 5/1998 | Pannetier et al. | |
| 5,747,255 | A | | 5/1998 | Brenner | |
| 5,804,375 | A | | 9/1998 | Gelfand et al. | |
| 5,834,202 | A | | 11/1998 | Auerbach | |
| 5,846,717 | A | | 12/1998 | Brow et al. | |
| 5,916,779 | A | | 6/1999 | Pearson et al. | |
| 5,928,869 | A | | 7/1999 | Nadeau et al. | |
| 5,942,391 | A | | 8/1999 | Zhang et al. | |
| 5,985,557 | A | | 11/1999 | Prudent et al. | |
| 6,033,881 | A | | 3/2000 | Himmler et al. | |
| 6,063,604 | A | | 5/2000 | Wick et al. | |
| 6,087,133 | A | | 7/2000 | Dattagupta et al. | |
| 6,090,552 | A | | 7/2000 | Nazarenko et al. | |
| 6,110,677 | A | | 8/2000 | Western et al. | |
| 6,130,038 | A | | 10/2000 | Becker et al. | |
| 6,144,455 | A | | 11/2000 | Tuunanen et al. | |
| 6,191,267 | B1 | | 2/2001 | Kong et al. | |
| 6,214,587 | B1 | | 4/2001 | Dattagupta et al. | |
| 6,251,600 | B1 | | 6/2001 | Winger et al. | |
| 6,261,768 | B1 | | 7/2001 | Todd et al. | |
| 6,294,337 | B1 | | 9/2001 | Hayashizaki | |
| 6,316,200 | B1 | | 11/2001 | Nadeau et al. | |
| 6,348,314 | B1 | | 2/2002 | Prudent et al. | |
| 6,350,580 | B1 | | 2/2002 | Sorge | |
| 6,372,434 | B1 | | 4/2002 | Weissman et al. | |
| 6,632,611 | B2 | | 10/2003 | Su et al. | |
| 6,656,680 | B2 | | 12/2003 | Nadeau et al. | |
| 6,692,917 | B2 | | 2/2004 | Neri et al. | |
| 6,743,582 | B2 | | 6/2004 | Nadeau et al. | |
| 6,852,986 | B1 | | 2/2005 | Lee et al. | |
| 6,861,222 | B2 | | 3/2005 | Ward et al. | |
| 6,884,586 | B2 | | 4/2005 | Van Ness et al. | |
| 6,893,819 | B1 | | 5/2005 | Sorge | |
| 6,958,217 | B2 | | 10/2005 | Pedersen | |
| 7,074,600 | B2 | | 7/2006 | Dean et al. | |
| 7,109,495 | B2 | | 9/2006 | Lee et al. | |
| 7,112,423 | B2 | | 9/2006 | Van Ness et al. | |
| RE39,885 | E | | 10/2007 | Nadeau et al. | |
| 7,276,597 | B2 | | 10/2007 | Sorge | |
| 7,309,573 | B2 | | 12/2007 | Sorge | |
| 7,373,253 | B2 | | 5/2008 | Eyre | |
| 7,628,781 | B2 | * | 12/2009 | Roy et al. | 604/523 |
| 7,888,108 | B2 | | 2/2011 | Woudenberg et al. | |
| 2002/0042059 | A1 | | 4/2002 | Makarov et al. | |
| 2002/0150919 | A1 | | 10/2002 | Weismann et al. | |
| 2003/0082590 | A1 | | 5/2003 | Van Ness | |
| 2003/0138800 | A1 | | 7/2003 | Van Ness et al. | |
| 2003/0165911 | A1 | | 9/2003 | Van Ness et al. | |
| 2004/0058378 | A1 | | 3/2004 | Kong et al. | |
| 2005/0009050 | A1 | | 1/2005 | Nadeau et al. | |
| 2005/0042601 | A1 | | 2/2005 | Wolfe | |
| 2005/0074362 | A1 | | 4/2005 | Lappe et al. | |
| 2005/0106750 | A1 | | 5/2005 | Tung et al. | |
| 2005/0112639 | A1 | | 5/2005 | Wang et al. | |
| 2005/0147973 | A1 | | 7/2005 | Knott | |
| 2005/0164207 | A1 | | 7/2005 | Shapero | |
| 2005/0202490 | A1 | | 9/2005 | Makarov et al. | |
| 2005/0233332 | A1 | | 10/2005 | Collis | |
| 2005/0266417 | A1 | | 12/2005 | Barany et al. | |
| 2006/0154286 | A1 | | 7/2006 | Kong et al. | |
| 2007/0020639 | A1 | | 1/2007 | Shapero | |
| 2007/0031857 | A1 | | 2/2007 | Makarov et al. | |
| 2007/0092402 | A1 | | 4/2007 | Wu et al. | |
| 2009/0017453 | A1 | | 1/2009 | Maples et al. | |

FOREIGN PATENT DOCUMENTS

| | | |
|---|---|---|
| WO | WO 99/07409 | 2/1999 |
| WO | WO 99/32619 | 7/1999 |
| WO | WO 00/01846 | 1/2000 |
| WO | WO 00/28084 | 5/2000 |
| WO | WO 00/44895 | 8/2000 |
| WO | WO 00/44914 | 8/2000 |
| WO | WO 01/29058 | 4/2001 |
| WO | WO 01/36646 | 5/2001 |
| WO | WO 03/008622 | 1/2003 |
| WO | WO 03/008624 | 1/2003 |
| WO | WO 03/008642 | 1/2003 |
| WO | WO 03/066802 | 8/2003 |
| WO | WO 03/072805 | 9/2003 |
| WO | WO 03/080645 | 10/2003 |
| WO | WO 2004/022701 | 3/2004 |
| WO | WO 2004/067726 | 8/2004 |
| WO | WO 2004/067764 | 8/2004 |
| WO | WO 2004/081183 | 9/2004 |
| WO | WO 2005/026329 | 3/2005 |
| WO | WO 2005/118853 | 12/2005 |
| WO | WO2010/141632 | 12/2010 |

OTHER PUBLICATIONS

Bass, "The short answer," Nature, 411:428-429, 2001.
Baulcombe, "An RNA Microcosm," Science, 297:2002-2003, 2002.
Buck et al., Research Report, "Design Strategies and Performance of Custom DNA Sequencing Primers," BioTechniques, 27:528-536, 1999.
Cai, "An Inexpensive and Simple Nucleic Acid Dipstick for Rapid Pathogen Detection," LAUR #05-9067 of Los Alamos National Laboratory, Aug. 22, 2006.
Church and Kieffer-Higgins, "Multiplex DNA Sequencing," Science, 240(4849):185-188, 1988.
Corstjens, et al., "Use of Up-Converting Phosphor Reporters in Lateral-Flow Assays to Detect Specific Nucleic Acid sequences: A Rapid, Sensitive DNA Test to Identify Human Papillomavirus Type 16 Infection," Clinical Chemistry, 47(10):1885-1893, 2001.
Crain and McCloskey, "Applications of mass spectrometry to the characterization of oligonucleotides and nucleic acids," A Current Opinion in Biotechnology, 9:25-34, 1998.
Dean et al., "Comprehensive human genome amplification using multiple displacement amplification," Proc. Natl. Acad. Sci. USA, 99(8):5261-66, 2002.
Demidov, "Rolling-circle amplification in DNA diagnostics: the power of simplicity," Expert Rev. Mol. Diagn., 2(6):89-95, 2002.
Elbashir et al., "Duplexes of 21-nucleotide RNAs mediate RNA interference in cultured mammalian cells," Nature, 411:494-498, 2001.
Hall et al., "Establishment and Maintenance of a Heterochromatin Domain," Science, 297:2232-2237, 2002.
Higuchi et al., "Simultaneous Amplification and Detection of Specific DNA Sequences," Nature Biotechnology, 10:413-417, 1992.
Hite et al., "Factors affecting fidelity of DNA synthesis during PCR amplification of d(C-A)$_n$ d(G-T)$_n$ microsatellite repeats," Nucl. Acids. Res., 24(12):2429-2434, 1996.

(56) References Cited

OTHER PUBLICATIONS

Hutvagner and Zamore, "A microRNA in a Multiple-Turnover RNAi Enzyme Complex," Science, 297:2056-2060, 2002.
Jenuwein, "An RNA-Guided Pathway for the Epigenome," Science, 297:2215-2218, 2002.
Koster et al., "A strategy for rapid and efficient DNA sequencing by mass spectrometry," Nature Biotechnol., 14:1123-1128, 1996.
Kurn et al., "Novel Isothermal, Linear Nucleic Acid Amplification Systems for Highly Multiplexed Applications," Clinical Chemistry, 51(10):1973-1981, 2005.
Lagos-Quintana et al., "Identification of Novel Genes Coding for Small Expressed RNAs," Science, 294:853-858, 2001.
Lau et al., "An Abundant Class of Tiny RNAs with Probable Regulatory Roles in *Caenorhabditis elegans*," Science, 294:858-862, 2001.
Lee and Ambros, "An Extensive Class of Small RNAs in *Caenorhabditis elegans*," Science, 294:862-864, 2001.
Limbach, "Indirect Mass Spectrometric Methods for Characterizing and Sequencing Oligonucleotides," MassSpectrom. Rev., 15:297-336, 1996.
Lizardi et al., "Exponential Amplification of Recombinant-RNA Hybridization Probes," Nature Biotechnology, 6:1197-1202, 1998.
Llave et al., "Cleavage of Scarecrow-like mRNA Targets Directed by a Class of Arabidopsis miRNA," Science, 297:2053-2056, 2002.
McManus et al., "Gene silencing using micro-RNA designed hairpins," RNA Society, 8:842-850, 2002.
Murray, "DNA Sequencing by Mass Spectrometry," J. Mass. Spectrom., 31:1203-1215, 1996.
Notomi, et al., "Loop-mediated isothermal amplification of DNA," Nucleic Acid Research, 28(12):e63 i-vii, 2000.
Reinhart and Bartel, "Centromere Heterochromatic Repeats," Science, 297:1831, 2002.
Reinhart et al., "MicroRNAs in plants," Gene & Dev., 16:1616-1626, 2002.
Ruvkun, "Glimpses of a Tiny RNA World," Science, 294:797-799, 2001.
Saiki et al., "Primer-Directed Enzymatic Amplification of DNA with a Thermostable DNA Polymerase," Science, 239:487-491, 1988.
Singer et al., "Characterization of PicoGreen Reagent and Development of a Fluorescence-Based Solution assay for Double-Stranded DNA Quantitation," Analytical Biochemistry, 249:228-238, 1997.
Tan et al., "Isothermal DNA Amplification Coupled with DNA Nanosphere-Based Colorimetric Detection," Anal. Chem., 77:7984-7992, 2005.
Tyagi and Kramer, "Molecular Beacons: Probes that Fluoresce upon Hybridization," Nature Biotechnology, 14:303-308, 1996.
Van Ness et al., Isothermal reactions for the amplification of oligonucleotides, PNAS, 100(8):4504-4509, 2003.
Volpe et al., "Regulation of Heterochromatic Silencing and Histone H3 Lysine-9 Methylation by RNAi," Science, 297:1833-1837, 2002.
Wade, "Studies Reveal an Immune System Regulator," New York Times, Apr. 27, 2007.
Zamore et al., "RNAi: Double-Stranded RNA Directs the ATP-Dependent Cleavage of mRNA at 21 to 23 Nucleotide Intervals," Cell, 101:25-33, 2000.

* cited by examiner

SYSTEM AND APPARATUS FOR REACTIONS

TECHNICAL FIELD

This invention relates to systems and apparatuses for liquid transfer and carrying out reactions.

BACKGROUND

Many diagnostic tests that involve biological reactions are required to be performed in laboratories by skilled technicians and/or complex equipment. Such laboratories may be the subject of government regulation. The costs of compliance with such regulations can increase the costs of diagnostic tests to patients and health care payers and exclude such tests from point-of-care facilities. There is a need for systems for performing diagnostic tests involving biological reactions that can be used without extensive training at the point of care.

SUMMARY

The present disclosure provides systems, apparatuses and methods for transfer of liquids and processing of reactions, e.g., in diagnostic tests.

In one aspect, the disclosure features a system that includes a liquid transfer device that includes a housing having a pipette tip and a plunger assembly; and a reaction chamber, wherein the housing of the liquid transfer device is configured to sealably engage with the reaction chamber. In some embodiments, the housing of the liquid transfer device can include a seal component, configured to sealably engage with the reaction chamber. In some embodiments, the reaction chamber can include a seal component configured to sealably engage with the liquid transfer device. The systems can further include a fluid reservoir, and the reaction chamber can optionally be configured to lockably engage with the fluid reservoir.

The liquid transfer device can be configured to lockably engage with the reaction chamber, e.g., without dispensing, prior to dispensing, and/or after dispensing a liquid sample.

In some embodiments, the reaction chamber includes one or more components of a biological reaction.

In another aspect, the disclosure features a liquid transfer device that includes a housing having a pipette tip; and a plunger assembly disposed within the housing and the pipette tip, wherein a portion of the plunger assembly is configured to engage a fluid reservoir such that the plunger assembly remains stationary relative to the fluid reservoir and the housing moves relative to the plunger assembly.

In some embodiments, movement of the housing relative to the plunger assembly results in creation of a vacuum within the pipette tip and, optionally, the plunger assembly can be configured to lock in a position resulting in creation of the vacuum. The housing can be configured to move relative to the plunger assembly by pushing the housing down on the fluid reservoir. The device can further be configured to provide an auditory and/or visual indication that the plunger assembly is in a position resulting in the creation of the vacuum.

A system can include the liquid transfer device and one or more of a fluid reservoir and reaction chamber. When a reaction chamber is included, the reaction chamber can be configured to unlock the plunger assembly when the liquid transfer device and the reaction chamber are interfaced.

In another aspect, the disclosure features a liquid transfer device configured to draw a sample from a fluid reservoir by pushing the device against the reservoir and systems that include the liquid transfer device and one or both of a reaction chamber and fluid reservoir.

In the systems described above, two or all three of the liquid transfer device, reaction chamber, and fluid reservoir can have compatible asymmetric cross-sections.

In another aspect, the disclosure features methods that include (i) obtaining a liquid sample from a sample reservoir using a liquid transfer device described above; and (ii) dispensing the liquid sample, e.g., into a reaction chamber comprising one or more components of a reaction.

In another aspect, the disclosure features methods that include (i) obtaining a liquid sample from a fluid reservoir using a liquid transfer device (e.g., a liquid transfer device described above); and (ii) dispensing the liquid sample into a reaction chamber, wherein the liquid transfer device sealably engages with the reaction chamber during or prior to dispensing.

In another aspect, the disclosure features methods that include (i) obtaining a liquid sample from a fluid reservoir using a liquid transfer device (e.g., a liquid transfer device described above); and (ii) dispensing the liquid sample into a reaction chamber, wherein the liquid transfer device lockably engages with the reaction chamber during or prior to dispensing. The methods can further include (iii) interfacing the reaction chamber and the fluid reservoir; such that the reaction chamber lockably engages with the fluid reservoir.

The systems, apparatuses, and methods disclosed herein can provide for simple analysis of unprocessed biological specimens. They can be used with minimal scientific and technical knowledge, and any knowledge required may be obtained through simple instruction. They can be used with minimal and limited experience. The systems and apparatuses allow for prepackaging or premeasuring of reagents, such that no special handling, precautions, or storage conditions are required. The operational steps can be either automatically executed or easily controlled, e.g., through the use of auditory and/or visual indicators of operation of the systems and apparatuses.

The details of one or more embodiments of the invention are set forth in the accompanying drawings and the description below. Other features, objects, and advantages of the invention will be apparent from the description and drawings, and from the claims.

DETAILED DESCRIPTION

This application describes systems, apparatuses, and methods for transfer of liquids and processing of biological reactions (e.g., nucleic acid amplification reactions).

Figure 1:
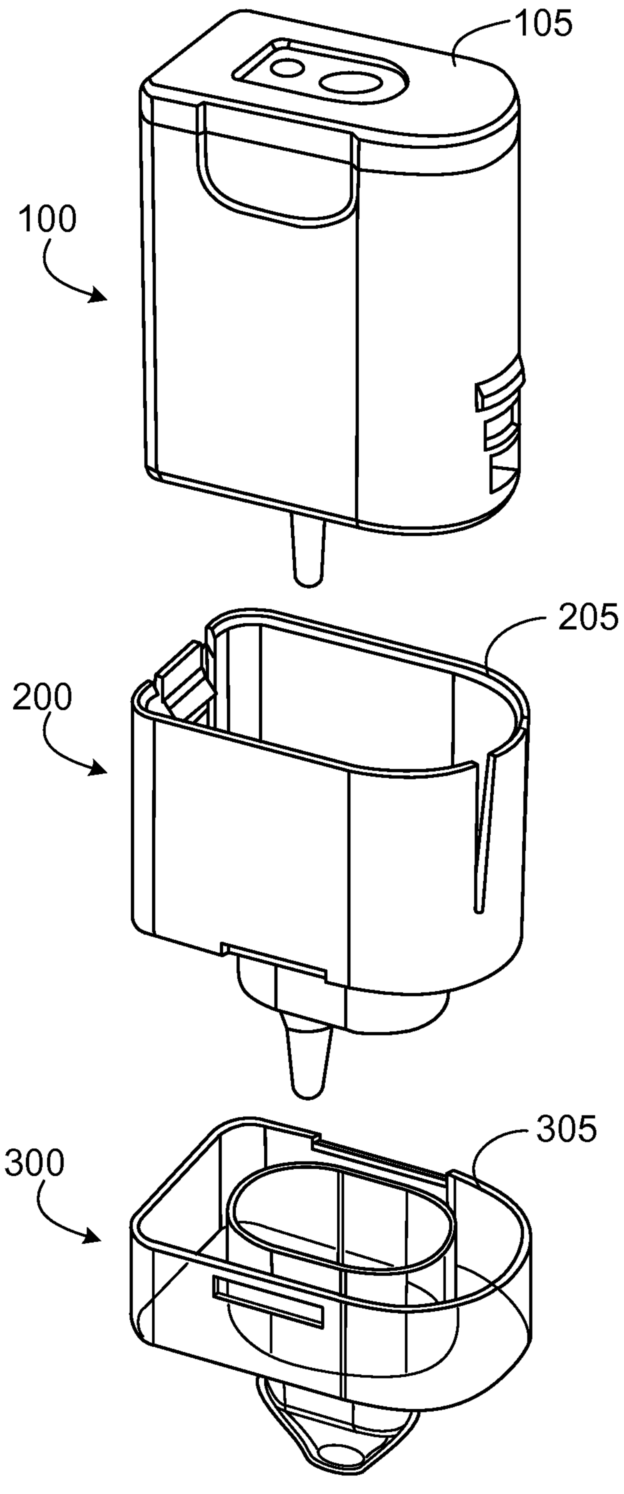
FIG. 1 is an exploded view of an exemplary system as described herein.

Referring to FIG. 1., the system can include three subassemblies: a transfer device 100, amplification chamber 200, and an elution container 300. Each subassembly can have a 1)-shaped or otherwise asymmetrical cross section 105, 205, 305 that is compatible with the other two subassemblies, such that the subassemblies may only be mated to each other in one orientation.

Figure 2A:
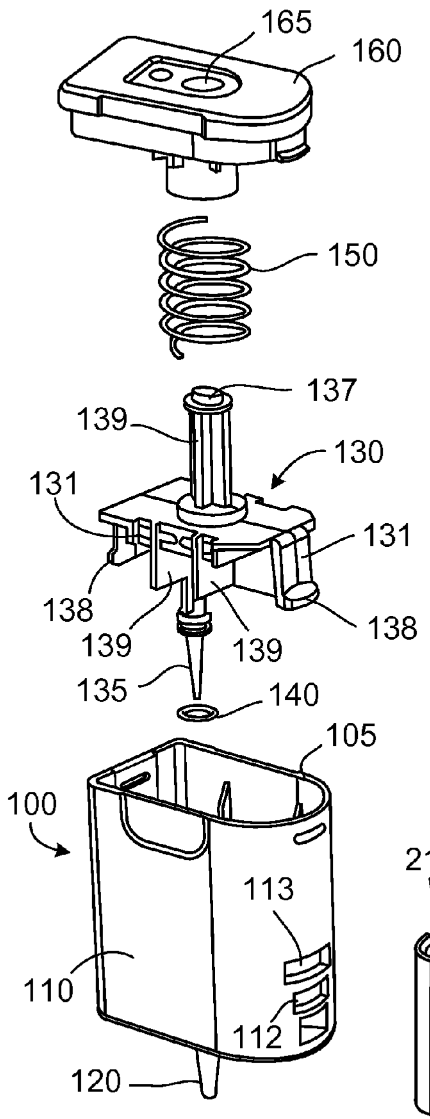
FIGS. 2A-2C are exploded views of system subassemblies.
Figure 2B:
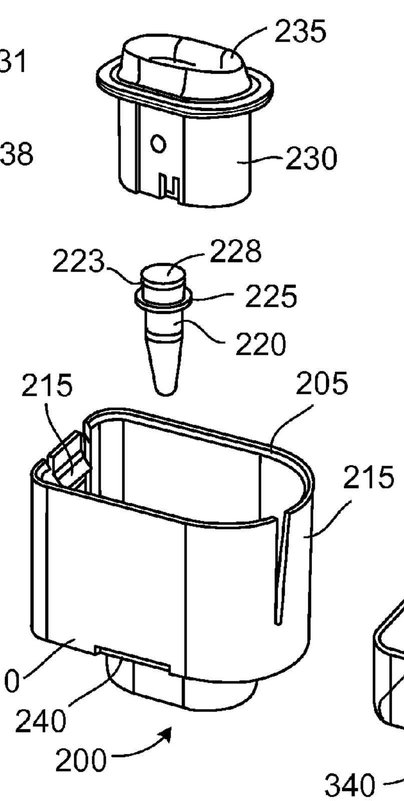
Figure 2C:
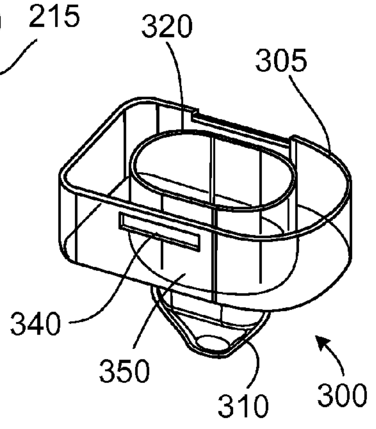

FIGS. 2A-2C, show exploded views of the subassemblies 100, 200, and 300, respectively. In FIG. 2A, the transfer device 100 includes a body 110 having a D-shaped or otherwise asymmetrical cross section 105 and a pipette tip 120. The transfer device also includes a plunger unit 130 having a syringe plunger 135 that seals within the pipette tip 120 using an o-ring 140. The plunger unit also includes flexible arms 131 having tabs 138 that are aligned with two sets of lower 112 and upper 113 slots in the body 110. Ridges within the body 110 align with grooves in the plunger unit 130 to guide the plunger unit 130 up and down within the body 110. When the plunger unit 130 is in the lower position, the tabs 138 insert into the lower slots 112. When the plunger unit 130 is in the upper position, the tabs 138 insert into the upper slots 113. A spring 150 fits over a spring guide 139 of the plunger unit 130, and can be compressed against the cap 160 when the transfer device 100 is assembled. When the plunger unit 130 is in the upper position, an indicator 137 at the top of the spring guide 139 is visible through an indicator window 165 in the cap 160.

In FIG. 2B, the amplification chamber 200 includes a body 210 having a D-shaped or otherwise asymmetrical cross-section 205 that is compatible with the cross-section 105 of the transfer device 100. The amplification chamber body 210 also includes two tabs 215 that insert into either the lower slots 112 or upper slots 113 of the transfer device 100 when the two subassemblies are mated. The reaction chamber 200 also includes a microtube 220 having a retaining ring 225 that holds the microtube 220 within an aperture in the bottom of the amplification chamber body 210. The microtube 220 can also have a seal 228 that covers the mouth 223 of the tube 220. In some embodiments, the microtube 220 is optically permeable to allow monitoring of its contents. The amplification chamber 200 also includes a sealing component 230 that fits within the amplification chamber body 210 and over the microtube 220, holding it in place. The sealing component 230 includes a pliant gasket 235 configured to seal against the pipette housing 180 when the two subassemblies are mated (see FIGS. 6A-6D). Two side tabs 240 are present near the bottom of the body 210 of the amplification chamber 200.

In FIG. 2C, the elution container 300 has a D-shaped or otherwise asymmetrical cross-section 305 that is compatible with the cross-section 105 of the transfer device 100. The elution container 300 includes an elution buffer reservoir 310 and a guide ring 320 compatible with a pipette housing 180 of the transfer device 100. A seal can cover the mouth of the buffer reservoir 310 or guide ring 320. Two notches 340 are present on the side walls 350 of the elution chamber 300, into which insert the side tabs 240 of the amplification chamber 200 when the two subassemblies are mated.

Figure 2D:
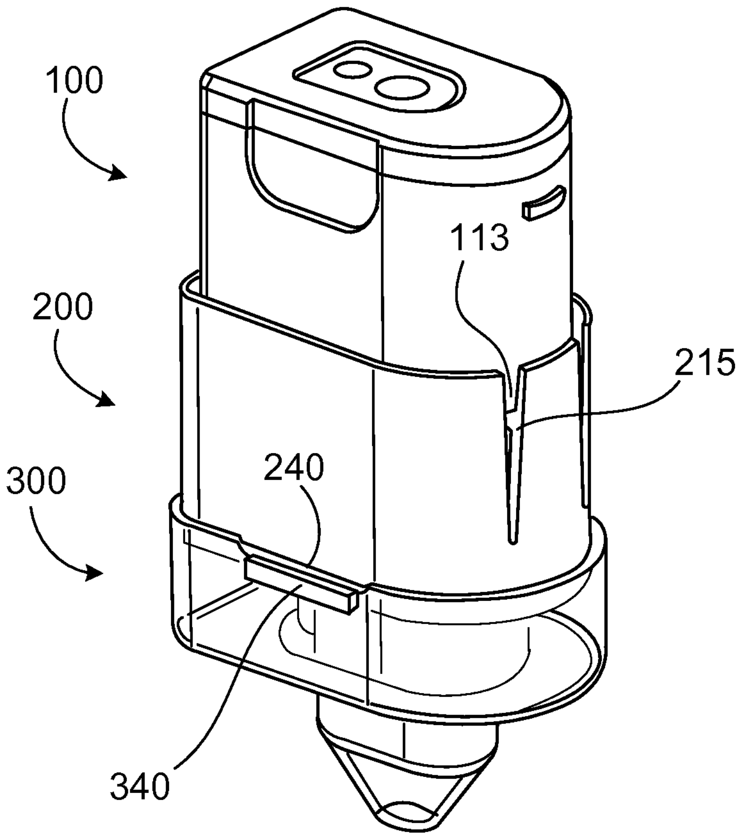
FIG. 2D is a view of the system mated and joined.

FIG. 2D shows the three subassemblies of the system mated and joined for disposal. The transfer device 100 locks into the amplification chamber 200 by insertion of the amplification chamber tabs 215 into the upper slots 113 of the transfer device 100. Similarly, the amplification chamber 200 locks into the elution chamber 300 by insertion of the side tabs 240 of the amplification chamber 200 into the notches 340 of the elution chamber 300. In this configuration, the patient sample and any amplified nucleic acids are sealed within the system to prevent contamination. Approximate dimensions of the joined system are shown.

Figures 3A, 3B, 3C, 3D:
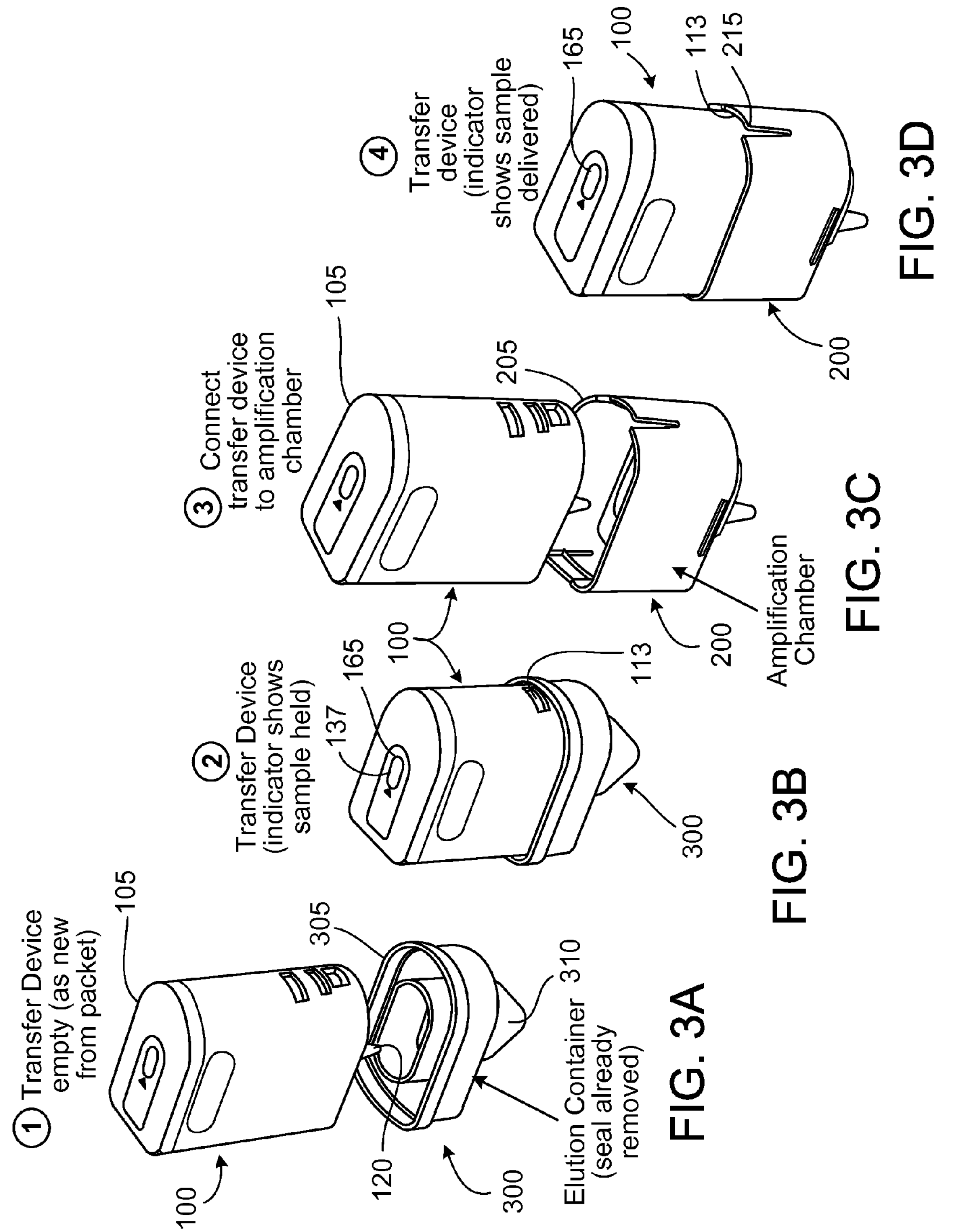
FIGS. 3A-3D depict the system in use.

FIGS. 3A-3D show an overview of the system in operation. In FIG. 3A, the transfer device 100 is positioned above the elution chamber 300 with their D-shaped cross-sections 105 and 305 aligned. In FIG. 3B, the transfer device 100 is pushed down on the elution chamber 300, such that the pipette tip 120 enters the buffer reservoir 310 and the plunger unit 130 remains stationary relative to the body 110 due to contact with a guide ring on the butler reservoir 310. This results in the plunger unit 130 in the upper position, compressing the spring 150 such that the indicator 137 shows through the indicator window 165. The presence of the indicator 137 in the indicator window 165 and an audible click as the tabs 138 insert into the upper slots 113 provide auditory and visual feedback that the transfer device has been manipulated properly such that the pipette tip 120 is able to withdraw a portion of the sample from the buffer reservoir 310. In FIG. 3C, the transfer device 100 has been removed from the elution chamber 300 and positioned above the amplification chamber 200 with their D-shaped cross-sections 105 and 205 aligned. In FIG. 3D, the transfer device 100 is pushed onto the amplification chamber 200. The two tabs 215 of the amplification chamber 200 insert into the upper slots 113 of the transfer device 100, displacing the tabs 138 and allowing the compressed spring 150 to relax and the plunger unit 130 to return to the lower position. The indicator 137 is no longer visible in the indicator window 165, signaling that the contents of the pipette tip 120 have been emptied into the microtube 220. The transfer device 100 is locked into the amplification chamber 200 by insertion of the amplification chamber tabs 215 into the upper slots 113 of the transfer device 100.

Figure 4:
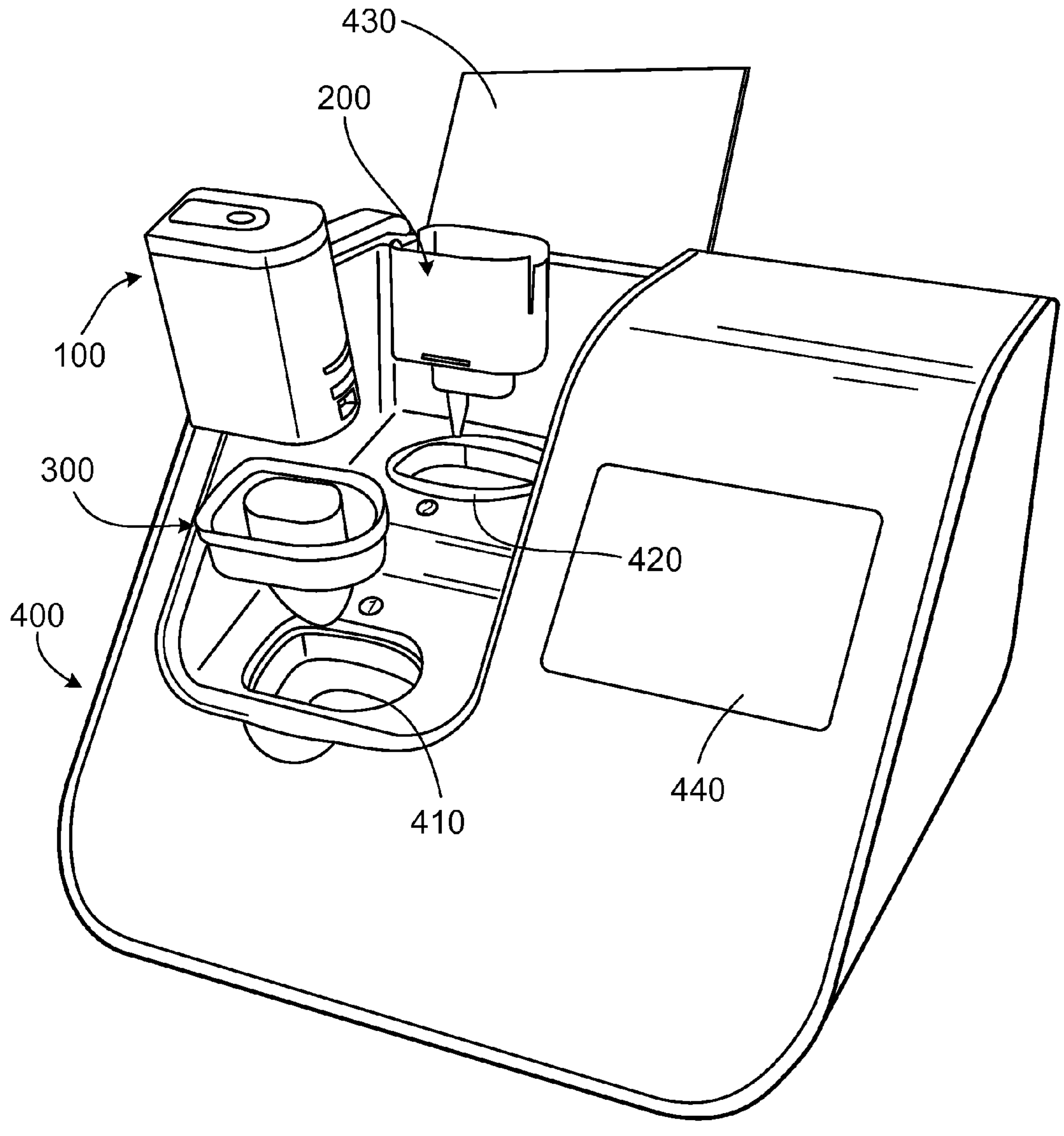
FIG. 4 depicts the system in the context of an exemplary detection device.

FIG. 4 shows the system with an exemplary detection device 400. The detection device 400 includes a first station 410 adapted to securely hold the elution chamber 300 and a second station 420 adapted to securely hold the amplification chamber 200. When in use, the transfer device 100 is moved between the elution chamber 300 at the first station 410 and the amplification chamber 200 at the second station 420. The detection device includes a lid 430 that can be closed when the detection device 400 is in operation or for storage. A touchscreen user interface 440 is present for inputting data and displaying information regarding the assay. The second station 420 can include a bar code reader or similar device to automatically detect a bar code or similar code present on the amplification chamber 200. The first 410 and second 420 stations can be adapted to heat or cool the contents of the elution chamber 300 and reaction chamber 200. The second station 420 can also be adapted to provide optical, fluorescence, or other monitoring and/or agitation of the microtube 220.

Figure 5A:
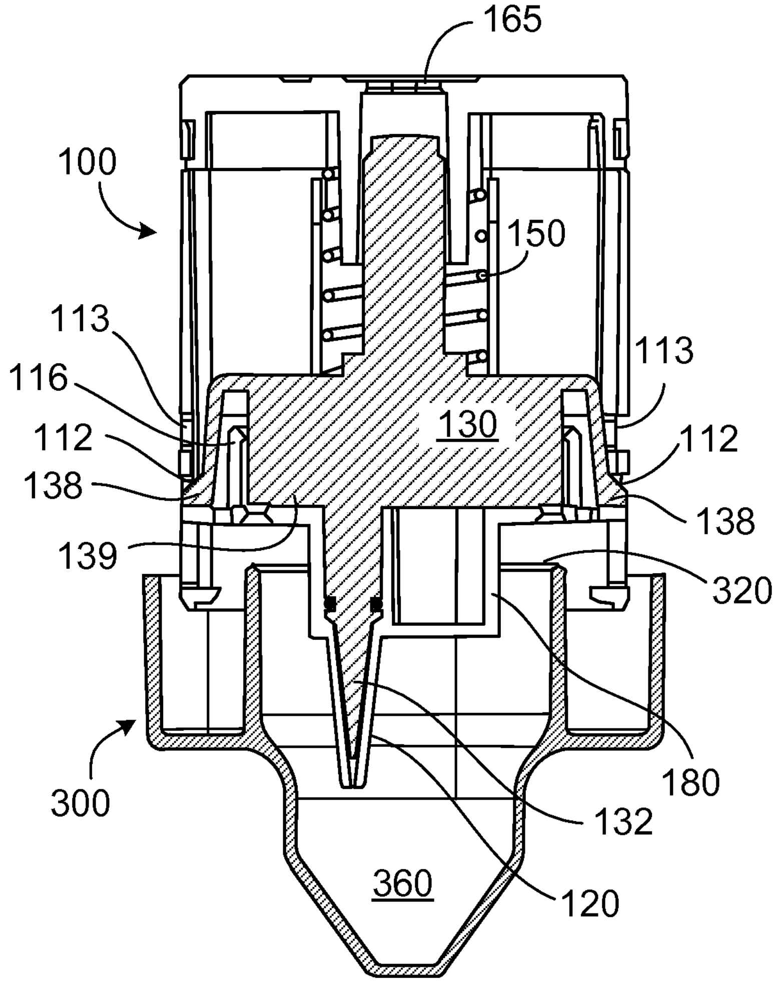
FIGS. 5A-5C depict the system in cross-section during sample collection.
Figure 5B:
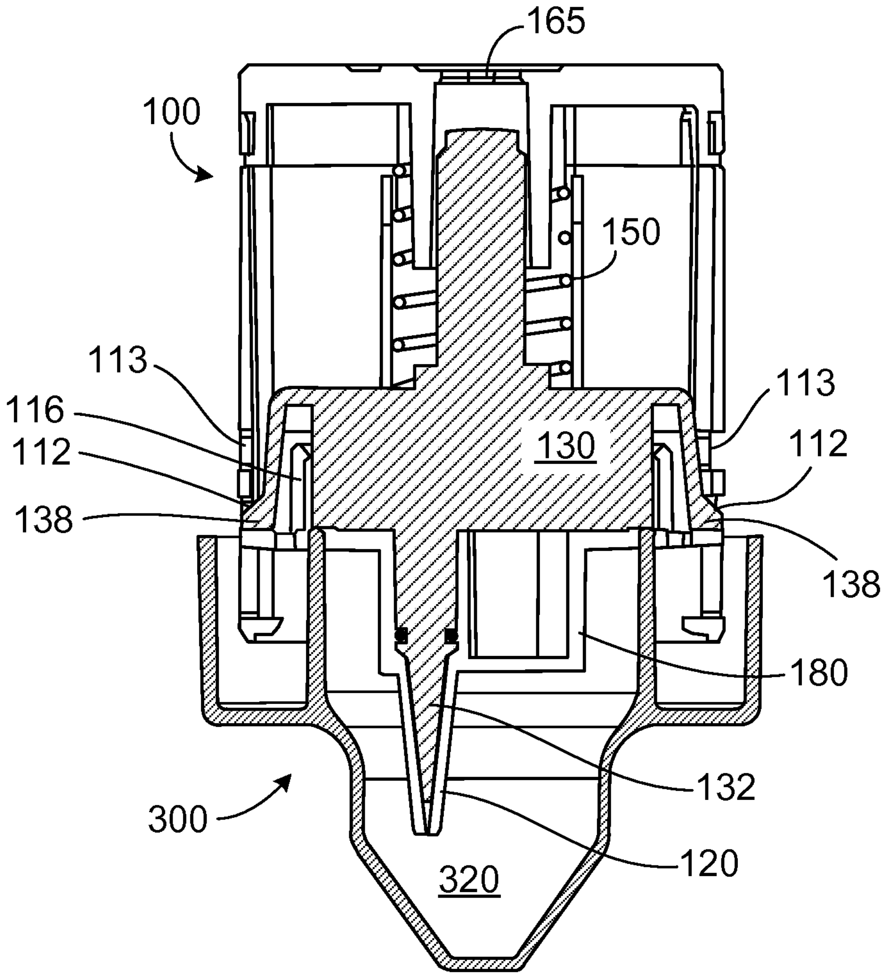
Figure 5C:
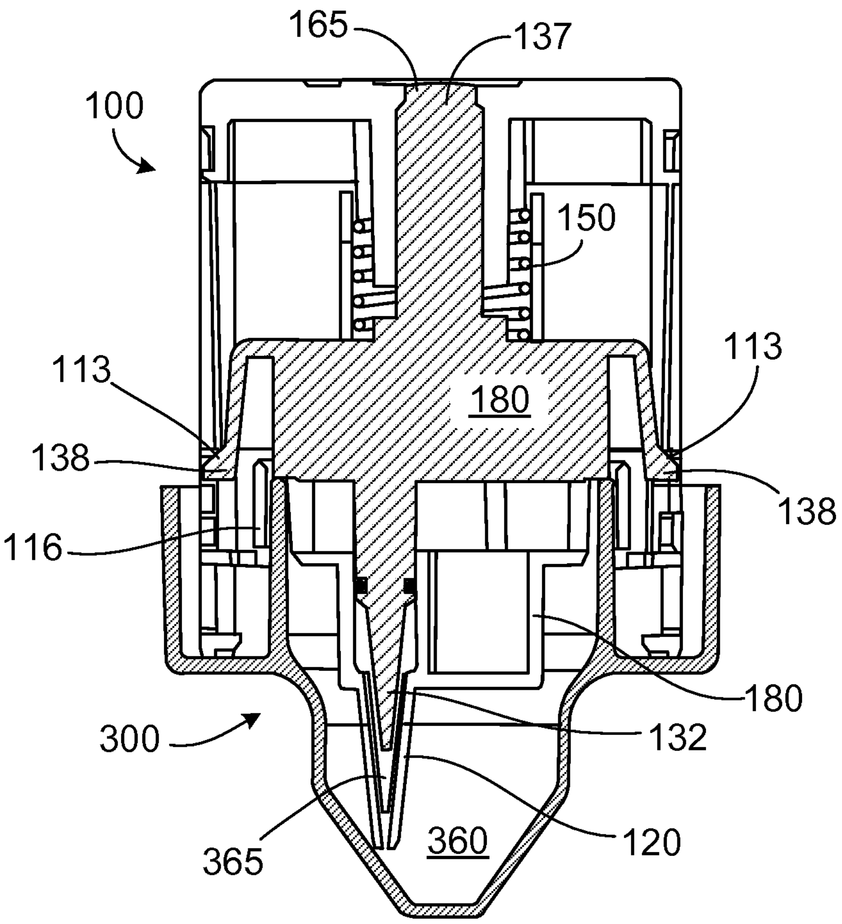

FIGS. 5A-5C show the system in cross-section during sample collection. In FIG. 5A, the transfer device 100 is placed above the elution chamber 300 such that their cross sections 105, 305 are aligned. The plunger unit 130 is in the lower position and the tabs 138 are in the lower slots 112. In FIG. 5B, the transfer device 100 is lowered until one or more flanges 139 on the lower surface of the plunger unit 130 contact the guide ring 320, and the pipette tip 120 and plunger tip 132 are inserted into the liquid sample 360. The liquid sample 360 can be a patient or other sample or include a patient or other sample dissolved or suspended in a buffer. In FIG. 5C, the transfer device 100 is pushed down by the user into the elution chamber 300. The plunger unit 130 remains stationary through the contact of the one or more flanges 139 against the guide ring 320, while the transfer device body 110 is lowered relative to the plunger unit 130 and elution chamber to 300. Simultaneously, a guide channel 116 in the transfer device is pushed downward relative to the guide ring 320. The downward motion of the transfer device body 110 causes the pipette tip 120 to move downward relative to the plunger tip 132 and draw a liquid sample portion 365 into the pipette tip 120. The downward motion of the transfer device body 110 relative to the plunger unit 130 also compresses the spring 150, moves the tabs 138 from the lower slots 112 to the upper slots 113, and causes the indicator 137 to be visible through the indicator window 165. The transfer device 100 with the liquid sample portion 365 can now be lifted off of the elution chamber 300 and is ready for transfer and dispensing.

Figure 6B:
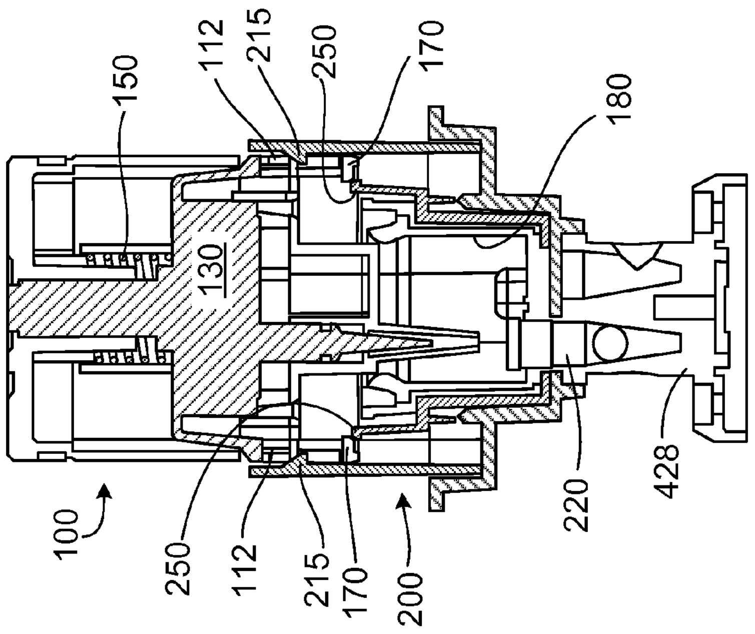
FIGS. 6A-6D depict the system in cross-section during sample dispensing.
Figure 6A:
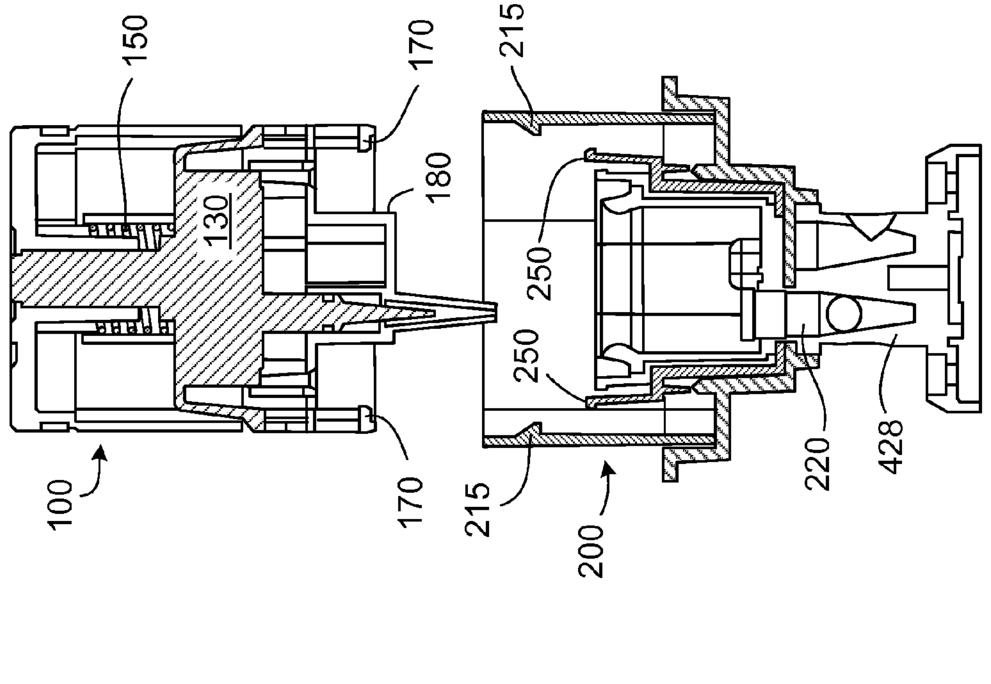
Figure 6D:
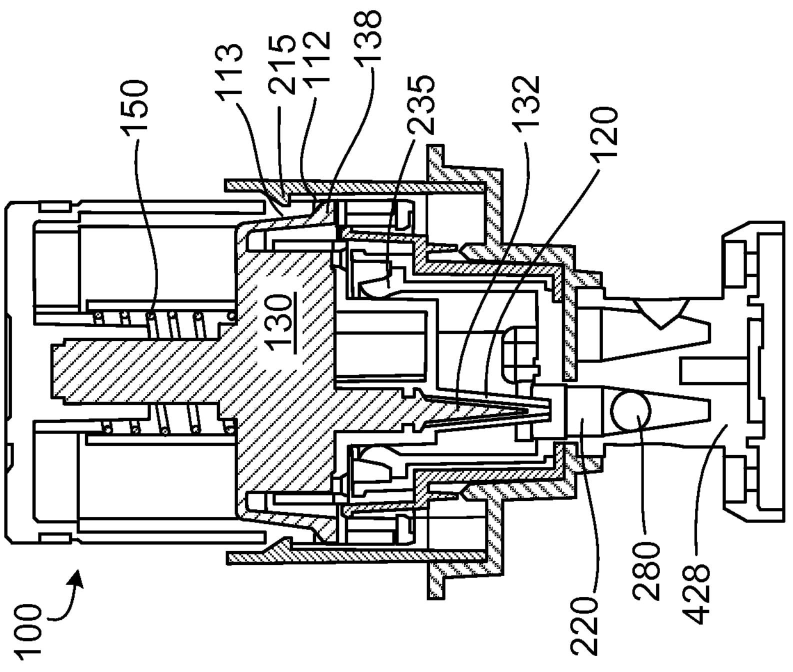
Figure 6C:
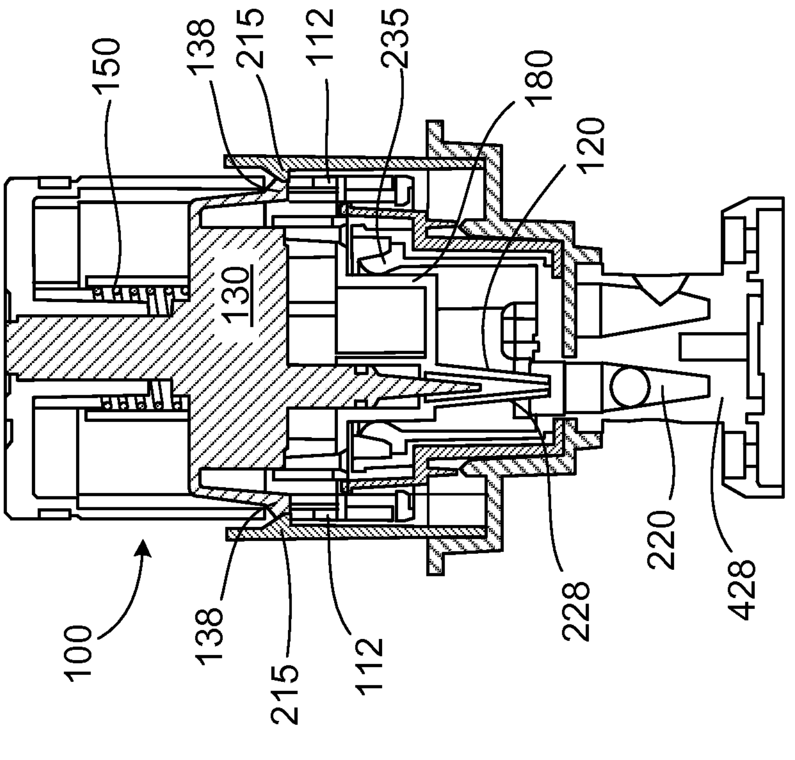

FIGS. 6A-6D show the system in cross-section during sample dispensing. In FIG. 6A, the transfer device 100 is placed above the amplification chamber 200 such that their cross sections 105, 205 are aligned. The amplification chamber 200 is held within the second station 420 of the detection device 400 with the microtube 220 seated within a tube holder 428. In FIG. 6B, the transfer device 100 is lowered until two inner tabs 250 within the amplification chamber 200 engage two ridges 170 in the lower sides of the transfer device body 110, the tabs 215 insert into the lower slots 112 of the transfer device 100, and the gasket 235 engages the pipette housing 180. This prevents the transfer device 100 from being easily removed from the amplification chamber 200 once dispensing has been started and prevents release of the sample. In FIG. 6C, the transfer device 100 is further lowered onto the amplification chamber 200, such that the amplification chamber tabs 215 insert into the upper slots 113 of the transfer device and displace the plunger unit tabs 138. Simultaneously, the pipette tip 120 pierces the seal 228 on the microtube 220. In FIG. 6D, the plunger unit 130, no longer held in the upper position, moves to the lower position as the spring 150 expands. This causes the plunger tip 132 to move downward within the pipette tip 120 and dispense the liquid sample portion 365 into the microtube 220. The liquid sample portion 365 rehydrates a dried reagent pellet 280 in the microtube 220, initiating reaction (e.g., an amplification reaction). The transfer device 100 is locked in place on the amplification chamber 200 by the tabs 215 inserted into the upper slots 113, and any product of the amplification reaction is sealed within the unit by the gasket 235.

Figure 7A:
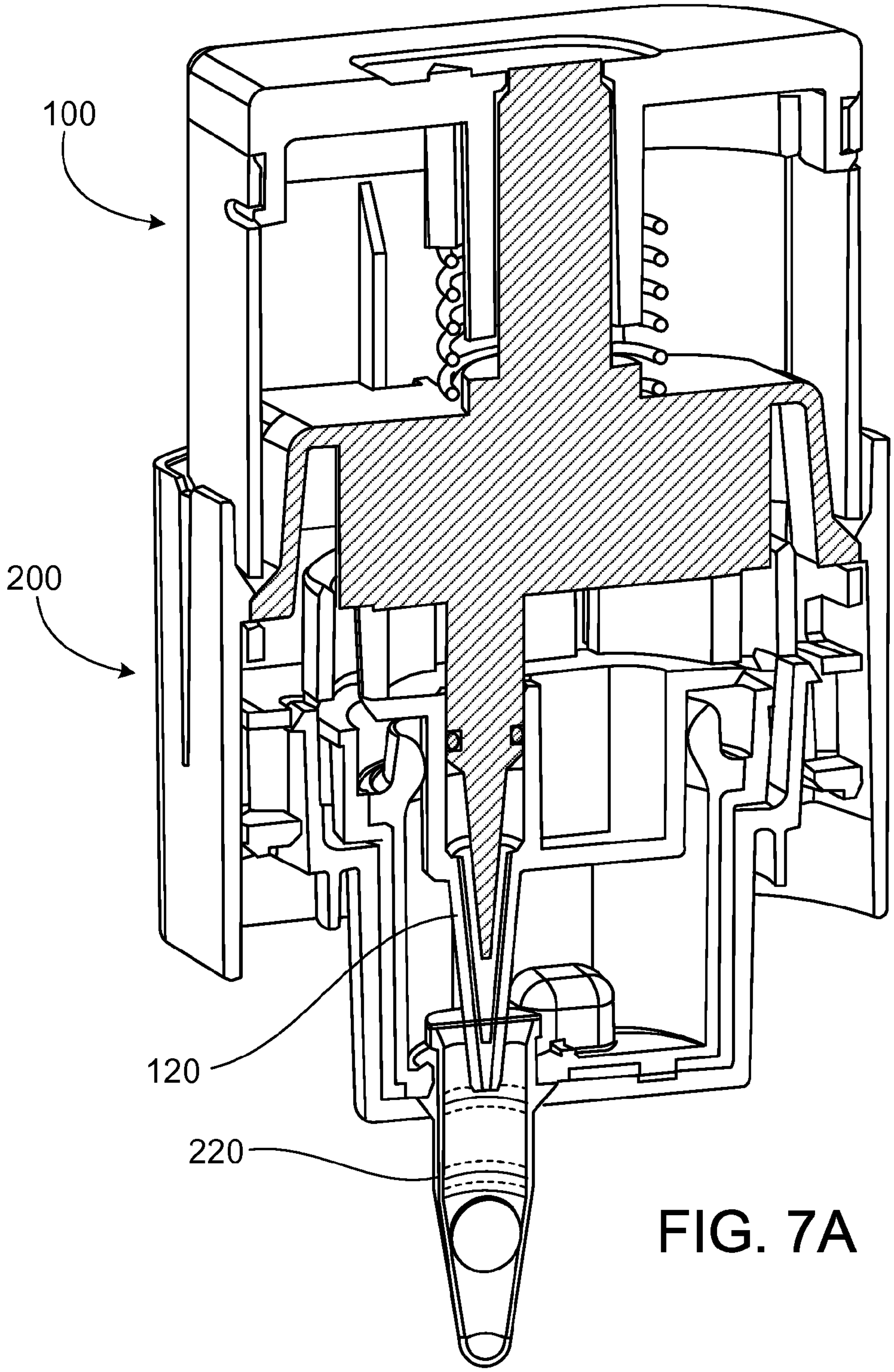
FIGS. 7A-7B depict single (7A) and double (7B) variants of the system.
Figure 7B:
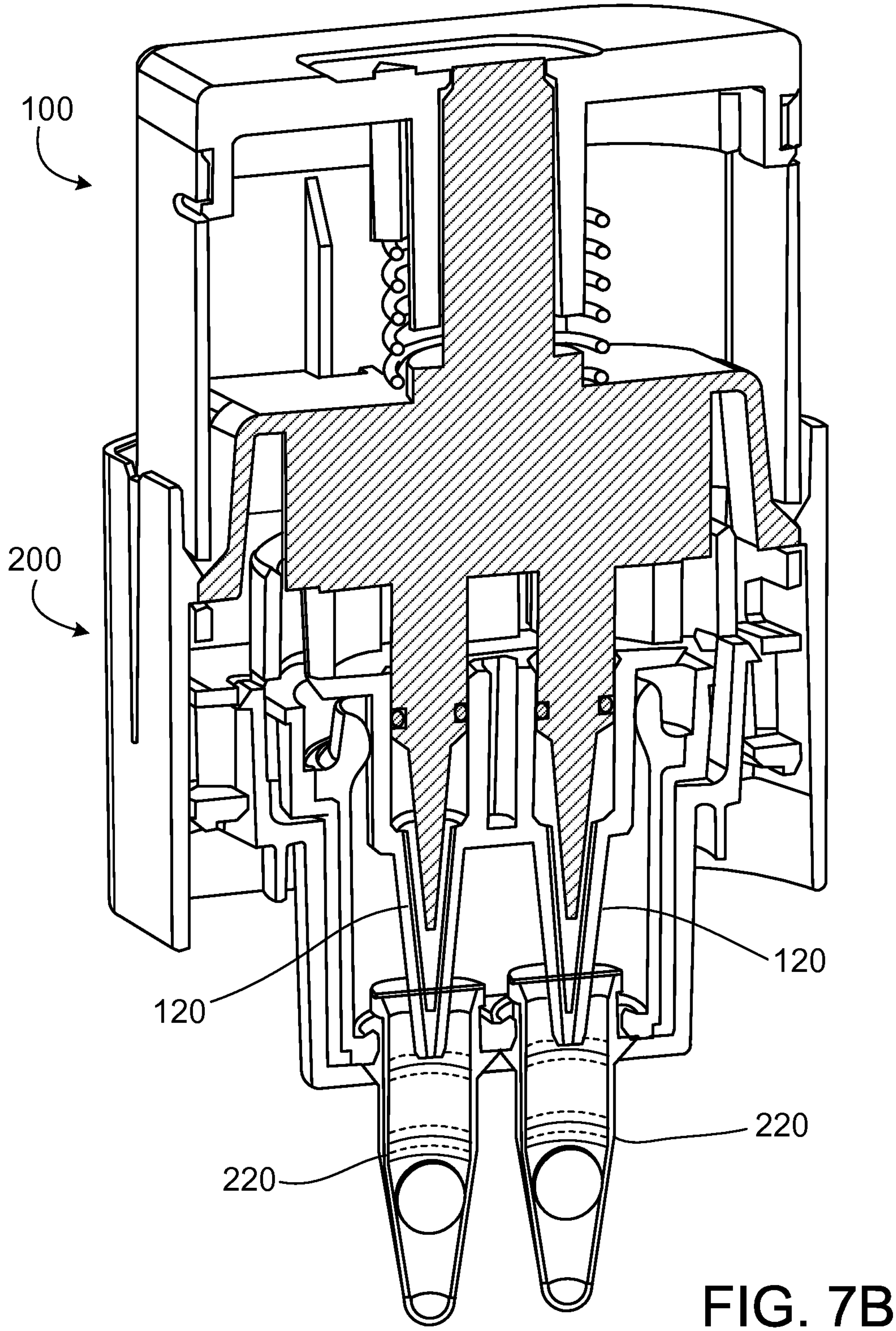

FIGS. 7A and 713 are three-quarter cross sections showing the system configured for one or two microtubes 220. FIG. 7A shows the transfer device 100 and amplification chamber 200 as described above with one pipette tip 120 and one microtube 220. FIG. 7B shows the transfer device 100 and amplification chamber 200 with two pipette tips 120 and two microtubes 220. Using the device in FIG. 7B, parallel reactions (e.g., amplification reactions) can be performed on two portions of one sample.

The systems and apparatuses disclosed herein can be used to perform reactions, e.g., utilizing biological components. In some embodiments, the reactions involve production of nucleic acids, such as in nucleic acid amplification reactions. Exemplary nucleic acid amplification reactions suitable for use with the disclosed apparatuses and systems include isothermal nucleic acid amplification reactions, e.g., strand displacement amplification, nicking and extension amplification reaction (NEAR) (see, e.g., U.S. Pat No. 2009/0081670), and recombinase polymerase amplification (RPA) (see, e.g., U.S. Pat. No. 7,270,981; U.S. Pat. No. 7,666,598). In some embodiments, a microtube can contain one or more reagents or biological components, e.g., in dried form (see, e.g., WO 2010/141940), for carrying out a reaction.

The systems and apparatuses disclosed herein can be used to process various samples in reactions, e.g., utilizing biological components. In some embodiments, the samples can include biological samples, patient samples, veterinary samples, or environmental samples. The reaction can be used to detect or monitor the existence or quantity of a specific target in the sample. In some embodiments, a portion of the sample is transferred using a transfer device as disclosed herein.

In some embodiments, a liquid transfer device or pipette tip disclosed herein can be configured to collect and dispense a volume between 1 μl and 5 ml (e.g., between any two of 1 μl, 2 μl, 5 μl, 10 μl, 20 μl, 50 μl, 100 μl, 200 μl, 500 μl, 1 ml, 2 ml, and 5 ml).

The disclosure also features articles of manufacture (e.g., kits) that include one or more systems or apparatuses disclosed herein and one or more reagents for carrying out a reaction (e.g., a nucleic acid amplification reaction).

A number of embodiments of the invention have been described. Nevertheless, it will be understood that various modifications may be made without departing from the spirit and scope of the invention. For example, a transfer device as described herein can include three or more pipette tips. Accordingly, other embodiments are within the scope of the following claims.

What is claimed is:

1. A system comprising:

a liquid transfer device comprising a housing having a pipette tip and a plunger assembly;

a fluid reservoir; and a reaction chamber, wherein the housing of the liquid transfer device comprises an asymmetrical cross-section that is compatible with a cross-section of a housing of the fluid reservoir and, when mated with the fluid reservoir, the liquid transfer device sealably engages with the fluid reservoir;

wherein the asymmetrical cross-section of the housing of the liquid transfer device is compatible with a cross-section of a housing of the reaction chamber and, when mated with the reaction chamber, the liquid transfer device lockably engages with the reaction chamber; and wherein the reaction chamber has an asymmetrical cross-section that is compatible with the cross-section of the housing of the fluid reservoir and, when mated with the fluid reservoir, the reaction chamber lockably engages with the fluid reservoir.

2. The system of claim 1, wherein the housing of the liquid transfer device comprises a gasket configured to sealably engage with the reaction chamber.

3. The system of claim 1, wherein the reaction chamber comprises a gasket configured to sealably engage with the liquid transfer device.

4. The system of claim 1, wherein the liquid transfer device is configured to lockably engage with the reaction chamber without dispensing.

5. The system of claim 1, wherein the liquid transfer device is configured to lockably engage with the reaction chamber after dispensing.

6. The system of claim 1, wherein the reaction chamber comprises one or more components of a biological reaction.

7. The system of claim 1, wherein the reaction chamber locks into the fluid reservoir when mated to form an irreversible seal.

8. The system of claim 1, wherein, when the liquid transfer device is mated with the fluid reservoir, the plunger assembly remains stationary relative to the fluid reservoir and the housing of the liquid transfer device moves relative to the plunger assembly.

9. The system of claim 8, wherein movement of the housing of the liquid transfer device relative to the plunger assembly results in creation of a vacuum within the pipette tip.

10. The system of claim 8, wherein the housing of the liquid transfer device is configured to move relative to the plunger assembly when the housing is advanced toward the fluid reservoir.

11. The system of claim 9, wherein the plunger assembly is configured to lock in a position resulting in creation of the vacuum.

12. The system of claim 9, wherein the device is configured to provide an auditory indication, a visual indication, or both when the plunger assembly is in a position resulting in the creation of the vacuum.

13. The system of claim 8, wherein the reaction chamber is configured to unlock the plunger assembly when the liquid transfer device and the reaction chamber are interfaced.

14. The system of claim 1, wherein the housing of the fluid reservoir comprises an outer wall and an inner wall, wherein the inner wall is spaced apart from and positioned within the outer wall.

15. The system of claim 14, wherein the liquid transfer device and the fluid reservoir sealably engage when mated with:

the plunger assembly engaged with the inner wall of the fluid reservoir, and the housing of the liquid transfer device positioned between the inner wall and the outer wall of the fluid reservoir.

16. The system of claim 1, wherein the liquid transfer device locks into the reaction chamber.

17. The system of claim 16, wherein the liquid transfer device defines openings and the reaction chamber comprises protrusions, and the liquid transfer device locks into the reaction chamber when the protrusions are seated in the openings.

18. The system of claim 16, wherein the reaction chamber locks into the fluid reservoir.

19. The system of claim 18, wherein the fluid reservoir defines openings, the reaction chamber comprises protrusions, and the fluid reservoir locks into the reaction chamber when the protrusions are seated in the openings.

20. The system of claim 18, wherein the system contains a biological material, and the biological material is sealed within the system.

21. The system of claim 1, wherein:

the pipette tip is a first pipette tip, and the plunger assembly further comprises a second pipette tip proximate the first pipette tip.

* * * * *